United States Patent [19]

Taguchi

[11] Patent Number: 5,745,801
[45] Date of Patent: Apr. 28, 1998

[54] CAMERA HAVING A MOTION COMPENSATION DEVICE

[75] Inventor: Fumiya Taguchi, Kawasaki, Japan

[73] Assignee: Nikon Corporation, Tokyo, Japan

[21] Appl. No.: 709,830

[22] Filed: Sep. 10, 1996

[30] Foreign Application Priority Data

Sep. 11, 1995 [JP] Japan .................. 7-232716
Sep. 14, 1995 [JP] Japan .................. 7-262586

[51] Int. Cl.⁶ .................................................. G03B 5/00
[52] U.S. Cl. ................................... 396/55; 396/277
[58] Field of Search ........................ 396/52–55, 277

[56] References Cited

U.S. PATENT DOCUMENTS 4,965,619 10/1990 Shikaumi et al. ................ 396/55
5,537,185 7/1996 Ohishi et al. ................... 354/472

FOREIGN PATENT DOCUMENTS 2-183217 7/1990 Japan .

OTHER PUBLICATIONS

U.S. application No. 08/352,878, Hirano et al., filed Dec. 9, 1994.

Primary Examiner—W. B. Perkey

[57] ABSTRACT

A camera has a motion compensation device which is stable in operation. A motion detection unit determine motions of the camera and a motion compensation unit drives a motion compensation optical system to remove blur of an image due to the motion of the camera. A communication unit transmits operating instructions based upon the amount of motion from the motion detection unit to the motion compensation unit and a monitoring unit determines whether an anomaly exists in the operating instructions. A locking unit locks the motion compensation optical system in a centering position if the anomaly exists. According to another embodiment, the motion compensation optical system is driven to a center position prior to the performance of the motion compensation and inhibits movement by the motion compensation optical system if a defect occurs during the centering operation.

20 Claims, 10 Drawing Sheets

CAMERA HAVING A MOTION COMPENSATION DEVICE

CROSS REFERENCE TO RELATED APPLICATIONS

The subject application relates to U.S. application Ser. No. 08/432,255, now U.S. Pat. No. 5,537,185, and U.S. application Ser. No. 08/352,878.

BACKGROUND OF THE INVENTION

The present invention relates to a camera having a motion compensation device which automatically suppresses hand tremor and other motions on a camera body which cause image blur, and in particular, relates to a camera in which the stability of operation is increased by determining whether communication anomalies exist between the camera body and the photographic lens.

The present invention further relates to a camera having a motion compensation device and which diagnoses error in a motion compensation control system before photography is performed to improve picture quality.

The following description and related figures are not admitted to be prior art, but rather are presented for clarifying the problems sought to be overcome by the subject invention.

Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

In known still cameras and movie cameras, indistinctness of an image occurs due to hand motion and other movements on the camera body at the time of photography. Consequently, cameras having a motion compensation device have been developed which, using angular velocity sensors or other sensors to detect vibration of the camera which may result in image blur, oscillate an optical axis of a photographic lens in a direction which negates the detected amount of vibration.

Figure 1:
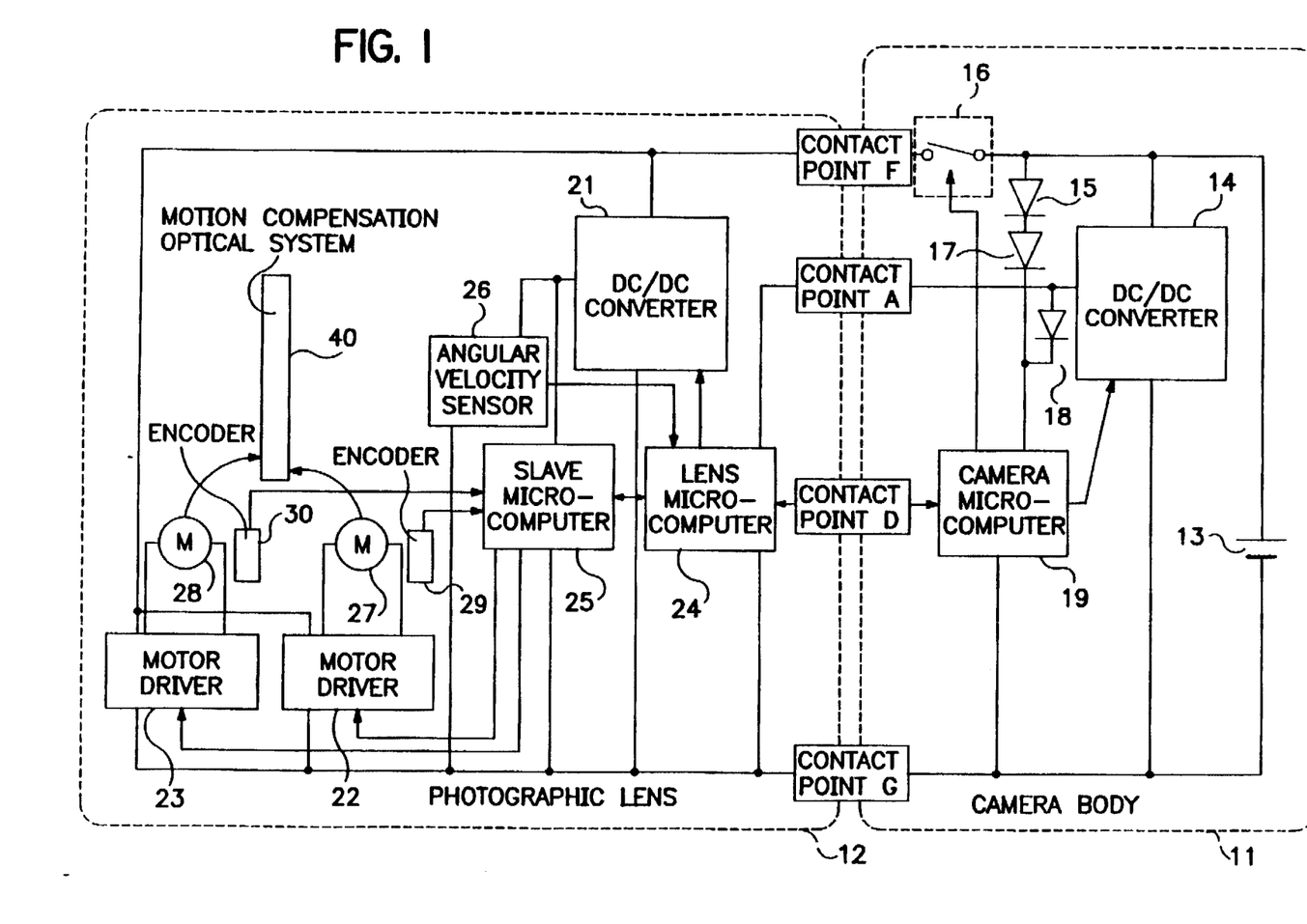
FIG. 1 is a diagram showing a first type of camera having a motion compensation device.

FIG. 1 is a block diagram showing a first type of camera having a motion compensation device. A camera body 11 contains a battery 13 having a positive pole connected to a power supply terminal of a DC/DC converter 14, an anode of a diode 15, and a terminal on one side of an electric supply switch 16. A terminal on the other side of the electric supply switch 16 is connected to a contact point F between the camera body 11 and a detachable photographic lens 12.

A negative terminal of the battery 13 is connected to respective ground connections of a camera microcomputer 19 and the DC/DC converter 14. A cathode of the diode 15 is connected to an anode of a diode 17 and an output terminal of the DC/DC converter 14 is connected to an anode of a diode 18 and a contact point A. A cathode of the diode 17 is connected to a cathode of the diode 18 and to a power supply terminal of the camera microcomputer 19. The input-output terminals of the camera microcomputer 19 are individually connected to the electric supply switch 16, the DC/DC converter 14 and a contact point D.

The photographic lens 12 is mounted on the camera body 11, and the two apparatuses are electrically connected by contact points F, A, D, and G between them. In the photographic lens 12, the contact point F is connected to a DC/DC converter 21 and to respective power supply terminals of motor drivers 22 and 23. The output of the DC/DC converter 21 is connected to the respective power supply terminals of a slave microcomputer 25 and an angular velocity sensor 26.

The contact point A is connected to a power supply terminal of a lens microcomputer 24.

The input-output terminals of the lens microcomputer 24 are individually connected to the contact point D, the DC/DC converter 21, the angular velocity sensor 26, and the slave microcomputer 25. Furthermore, the input-output terminals of the slave microcomputer 25 are individually connected to the motor drivers 22, 23 and to encoders 29, 30. The outputs of the motor drivers 22 and 23 are connected to motors 27, 28, respectively.

The contact point G is connected to the respective ground terminals of the DC/DC converter 21, the lens microcomputer 24, the slave microcomputer 25, the angular velocity sensor 26 and the motor drivers 22, 23.

A motion compensation optical system 40 is established at an unrestricted inclination on the optical axis of the photographic lens 12, and is oscillated by motors 27, 28.

Figure 2:
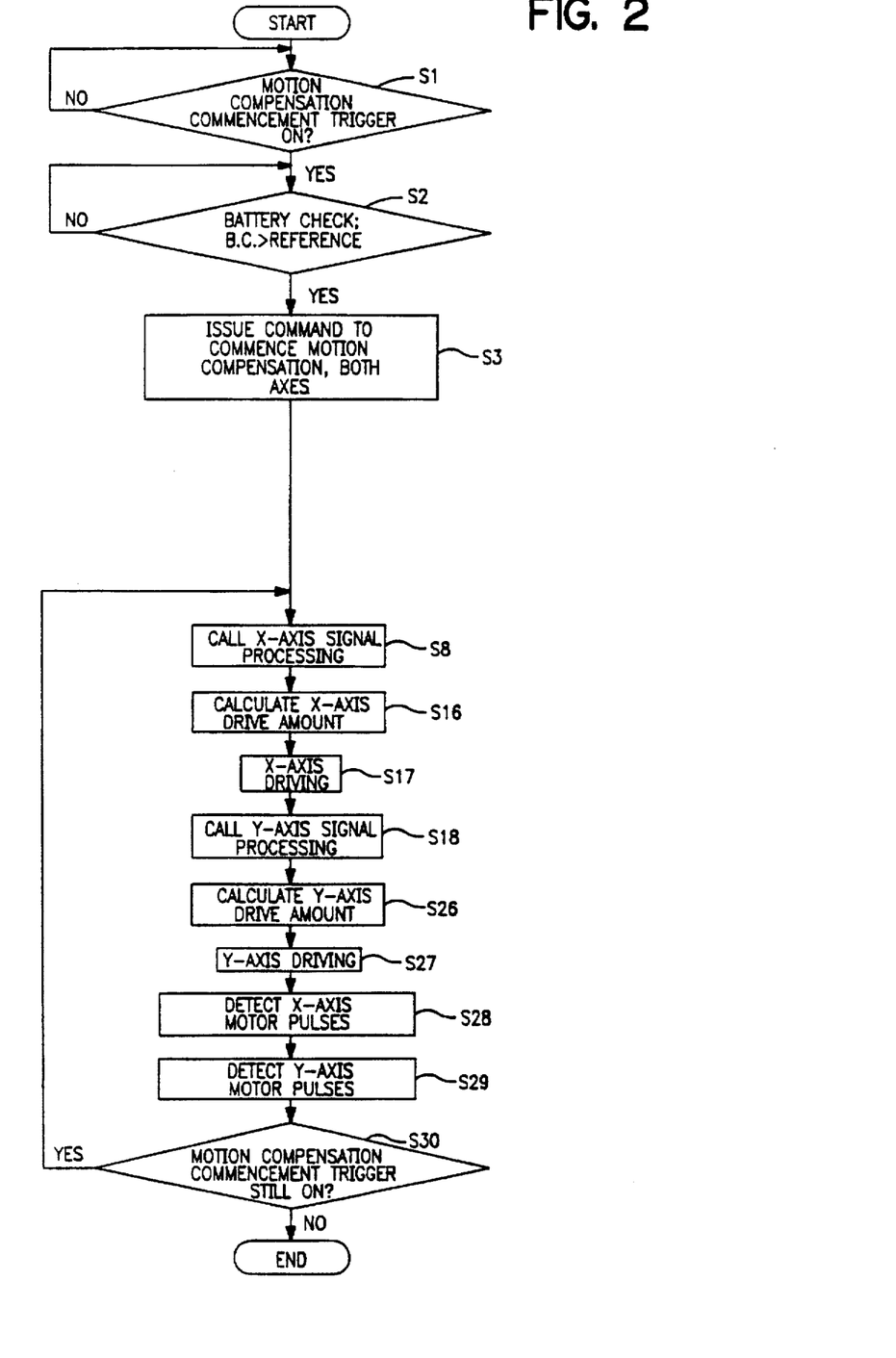
FIG. 2 is a flow chart describing the operation of the first type of camera shown in FIG. 1.
Figure 3:
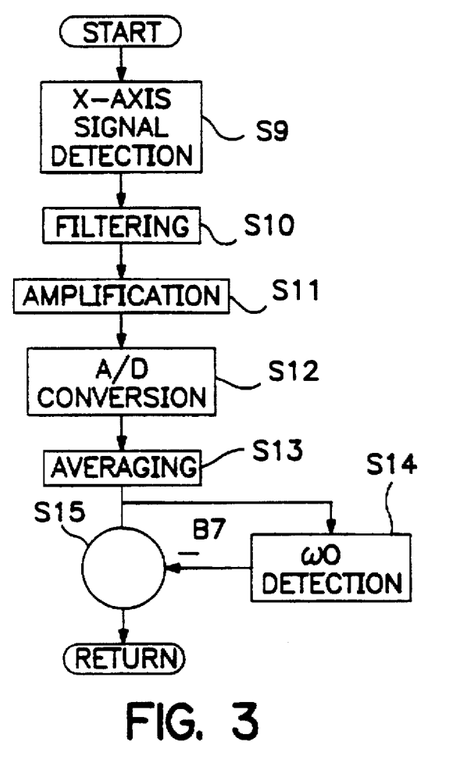
FIG. 3 is a flow chart describing the X-axis signal processing shown in FIG. 2.
Figure 4:
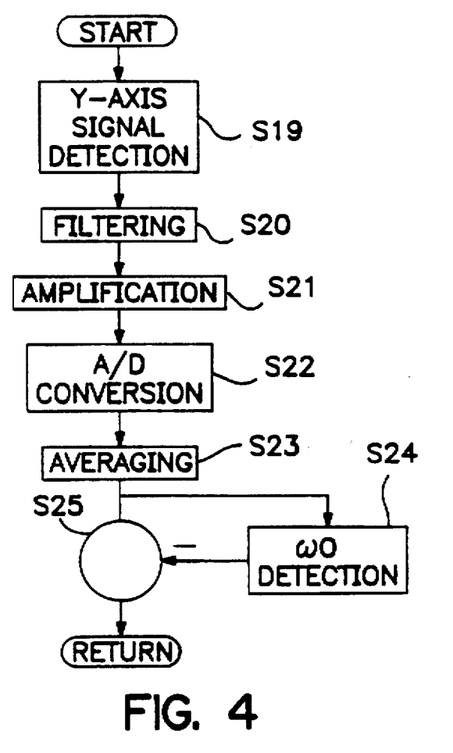
FIG. 4 is a flow chart describing the Y-axis signal processing shown in FIG. 2.

FIGS. 2 through 4 are flow charts which describe the operation of the first type of camera having the motion compensation device of FIG. 1.

First, as shown at step S1 of FIG. 2, when a release button (not shown in the drawings) is half depressed, the camera microcomputer 19 causes the DC/DC converter 14 to start operation, producing an electric supply to the lens microcomputer 24 in the photographic lens 12 via the contact point A.

Here, the lens microcomputer 24, at this starting point, is directed to "commence electric supply to contact point F" by the camera microcomputer 19. On the camera body 11 side, the battery voltage of the battery 13 supplies electricity to the photographic lens 12 side. This battery voltage supplies electricity directly to the motor drivers 22, 23 via the contact point F and, in addition, via the DC/DC converter 21, to the slave microcomputer 25 and the angular velocity sensor 26. In this manner, after the battery voltage has been supplied to the photographic lens 12, the following motion compensation is carried out.

At step S2, the camera microcomputer 19 performs a check of the battery voltage of the battery 13, entering a waiting state until the battery voltage becomes greater than a predetermined permissible value. In the case that the battery voltage is greater than the predetermined permissible value, at step S3, the camera microcomputer 19 communicates a motion compensation operating instruction to the lens microcomputer 24 via the contact point D.

When this motion compensation operating instruction is received by the lens microcomputer 24, a motion compensation routine for the X-axis direction is carried out at step S8 of FIG. 2. Steps S9 through S15 of FIG. 3 show this motion compensation routine in greater detail. Namely, the lens microcomputer 24 inputs the X-axis direction blurring motion from the angular velocity sensor 26, and calculates the drive amount of the motor 27 to negate the X-axis direction blurring motion. The slave microcomputer 25 controls the motor 27, based on this drive amount, and oscillates the motion compensation optical system 40 in the X-axis direction at steps S17 and S28.

FIG. 3 shows the motion compensation routine for the X-axis direction. At step S9, a motion detection signal is received from the angular velocity sensor 26. At step S10, the motion detection signal is passed through a filter (not shown) to discriminate the frequency thereof, and in step S11, the discriminated frequency signal is amplified. At step S12, the amplified signal undergoes A/D conversion and at step S13 an averaging process is performed on the converted motion detection signal. At step S14, average values of the converted motion detection signal found in the averaging process are calculated. At step S15, a difference is found between the current average value and the previous average value.

Then, returning to FIG. 2, at step S16, the lens microcomputer 24 calculates the amount of drive of the motor 27 necessary to drive the motion compensation optical system 40 in the X-axis direction to compensate for the detected X-axis motion based upon the results of the X-axis processing. At step S17, the motor 27 drives the motion compensation optical system in accordance with the X-axis drive amount.

Motion compensation is performed in the Y-axis direction in a similar manner as in the X-axis direction at steps S18 (shown in greater detail in steps S19 through S25 of FIG. 4), and steps S26 and S27 of FIG. 2.

FIG. 4 shows the motion compensation routine for the Y-axis direction (S18) in greater detail. Steps S19 through S25 are the same as S9 through S15, respectively, with the exception being that the steps are performed with regard to the Y-axis instead of the X-axis. Accordingly, a description of these steps is omitted here.

In step S26 of FIG. 2, the lens microcomputer 24 calculates the amount of drive of the motor 28 necessary to drive the motion compensation optical system 40 in the Y-axis direction to compensate for the detected Y-axis motion based upon the results of the Y-axis processing. In step S27, the motor 28 drives the motion compensation optical system 40 in accordance with the Y-axis drive amount.

In step S28 and S29, the encoders 29 and 30 detect the X-axis and Y-axis motor pulses, respectively.

The lens microcomputer 24, until the motion compensation operation disengages at step S30 of FIG. 2, returns to step S8 and repeats the above-mentioned motion compensation (operation).

Moreover, in the first type of camera, the angular velocity sensor 26 which measures the amount of vibration is loaded in the photographic lens 12, but angular velocity sensors which are loaded in the camera body 11 are also known. In this latter type of camera, the camera microcomputer 19 communicates the vibration amount which has been measured via the contact point D to the lens microcomputer 24.

Because communication is performed between the camera microcomputer 19 and the lens microcomputer 24, there is a risk of the operating instructions or the data of the vibration amount being altered due to bad contacts of the lens microcomputer 24, etc., external noise and the like.

There also is a problem that, if it should happen that motion compensation is carried out using erroneous data, because the motors 27, 28 are driven arbitrarily, large loads are applied to the lenses, and there is a risk of damaging the camera.

Another problem is that when such erroneous motion compensation is carried out, because the optical axis of the photographic lens 12 oscillates arbitrarily, an image with a large amount of image blur is produced.

Still yet another problem is that when erroneous motion compensation is carried out, because the two motors 27, 28 are driven to an incorrect position, the battery 13 is wastefully exhausted.

In a second type of camera, as disclosed in Japanese Laid-Open Patent Publication JP-A-2-183217, motion compensation devices detect motion of the camera body, video camera body or the like, by using an angular velocity sensor or another type of sensor, and suppress image blur by causing the motion of a motion compensation optical system in a direction which is the reverse of the direction of the blurring motion which has been detected. In such devices, centering of the motion compensation optical system is performed when the power supply is turned ON.

Devices such as JP-A-2-183217 encounter a problem in that the fault diagnosis of the control system which drives the compensation function of the motion compensation device is defective. Diagnosis is not known until the control is actually performed. If the motion compensation control system which causes the position of the optical axis to change is faulty, because there is a risk of negative effects on the picture quality, it is preferable for the fault to be known before performing photography.

SUMMARY OF THE INVENTION

Accordingly, it is an object of the present invention to provide a camera having a motion compensation device and which prepares for a communication anomaly between the camera body and the photographic lens, resulting in a camera which can markedly increase the stability of the motion compensation function.

It is another object of the present invention to improve picture quality by diagnosing faults of a motion compensation control system before photography is performed, thereby also increasing the stability of the motion compensation function.

Objects of the present invention are achieved by a camera which includes a photographic lens for producing an image of a photographic subject and a camera body, attached to the photographic lens, for receiving the image from the photographic lens. The camera further includes a motion detection unit to detect motion of one of the photographic lens and the camera body and, in response, generates operating instructions, a motion compensation unit which moves the optical axis of the photographic lens in a direction to negate the motion detected by the motion detection unit in response to the operating instructions, a communication unit to transmit the operating instructions from the motion detection unit to the motion compensation unit, a monitoring unit to determine whether an anomaly exists in the operating instructions, and an electric supply unit which stops operation of the motion compensation unit in response to receiving an indication that the anomaly exists in the operating instructions.

The monitoring unit determines that communication is normal when the communication sequence has ended normally and the electric supply unit resumes the electric supply when the decision of the monitoring unit changes from "communication anomaly" to "communication normal."

A locking unit locks the optical axis of the photographic lens when the monitoring unit has determined that the communication is incorrect. The locking unit centers the optical axis of the photographic lens prior locking the same when the monitoring unit has determined that the communication is incorrect.

Thus, the locking unit operates when some type of communication anomaly occurs in the communication unit, such as when a predetermined communication sequence has ended incorrectly, or a state of no transmission has continued for more than a predetermined time.

The monitoring unit monitors the state of communication, and judges this anomalous state. The electric supply unit, according to the determination of the monitoring unit of an "anomalous communication," stops the power supply with respect to the motion compensation unit or the motion detection unit. In this manner, when the power supply is stopped, the operation of motion compensation is temporarily halted.

If the operation of the communication unit is in a normal state, a previously determined communication sequence ends normally and the monitoring unit monitors the communication state, and determines this normal state.

When the decision of the monitoring unit changes from "communication anomaly" to "communication normal," the electric supply unit resumes the electric supply to the motion compensation unit or to the motion detection unit. In this manner, by the resumption of the power supply, the operation of motion compensation is recommenced.

The optical axis of the photographic lens is locked after being moved to a centering position in response to the stoppage of the electric supply to the image blur suppression unit or to the motion detection unit.

Objects of the present invention may also be achieved by providing a camera for generating an image of a photographic subject and having a camera body. The camera further includes a motion detection unit to detect motion of the camera body, a motion compensation optical system to compensate for blurring of the image caused by the detected motion, a motion compensation unit to drive the motion compensation optical system to compensate for the image blur, and a control unit to control the motion compensation unit based upon the detected motion of the motion detection unit wherein the control unit controls the motion compensation unit to drive the motion compensation optical system to a predetermined position in a motion compensation mode in response to an occurrence of an event, the event being one a photographic lens being mounted on the camera body and a power supply being connected to the camera.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now made in detail to the present preferred embodiments of the present invention, examples of which are illustrated in the accompanying drawings, wherein like reference numerals refer to like elements throughout. The embodiments are described below in order to explain the present invention by referring to the figures.

Figure 5:
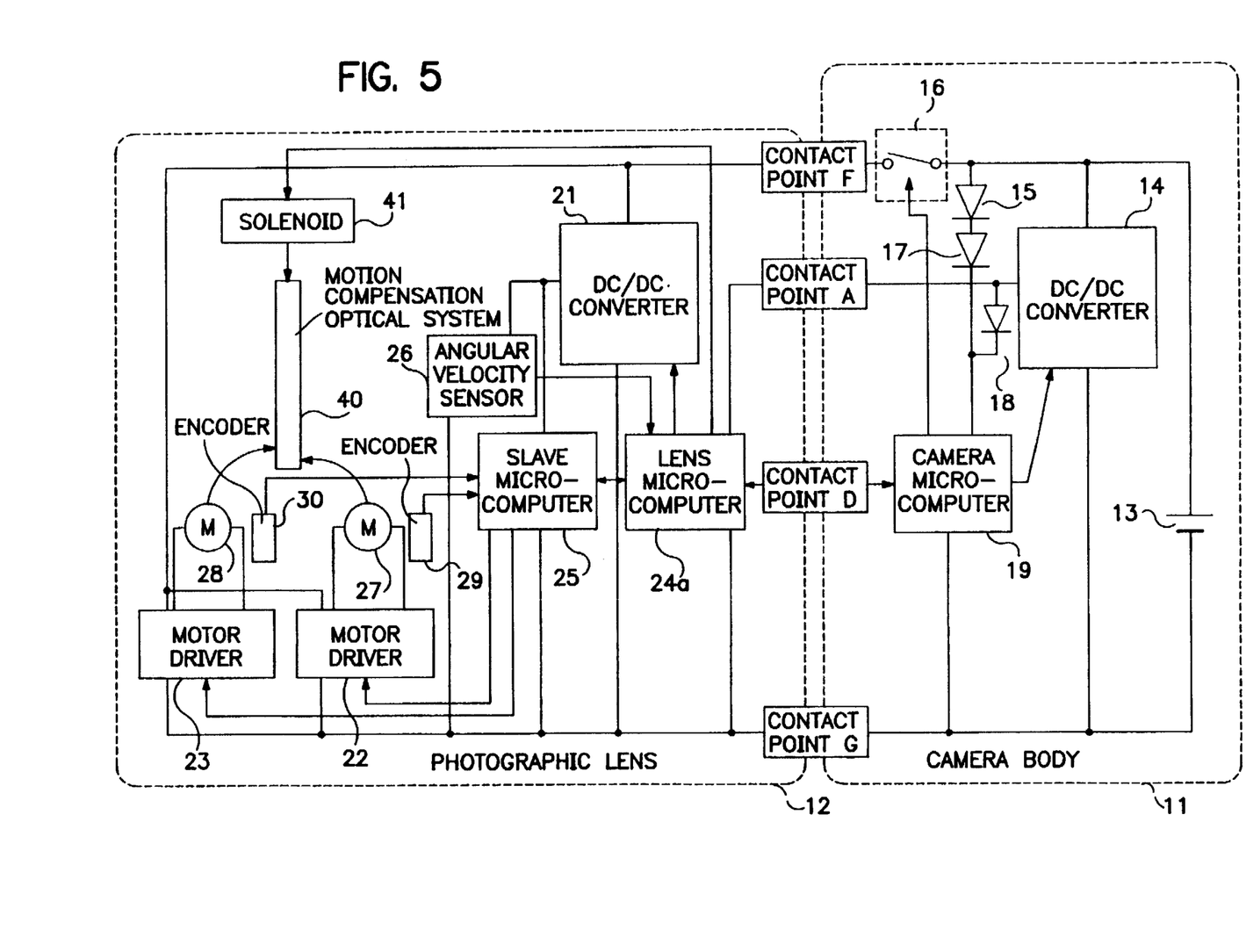
FIG. 5 is a block diagram showing a camera having a motion compensation device according to an embodiment of the present invention.

FIG. 5 is a diagram showing a camera according to an embodiment of the present invention. In relation to FIG. 1, a lens microcomputer 24a is substituted for the lens microcomputer 24, and a solenoid 41 which locks the oscillation of the motion compensation optical system 40 is connected to an output terminal of the lens microcomputer 24a. Otherwise, the same symbols are used for like elements which are shown in FIG. 1, and a description of these elements is omitted here.

A motion detection unit includes the angular velocity detector 26, the motion compensation unit includes the slave microcomputer 25, motor drivers 22, 23, motors 27, 28, encoders 29, 30. A communication unit includes the camera microcomputer 19 and the lens microcomputer 24a. A monitor unit includes the lens microcomputer 24a and an electric supply unit corresponds to the battery 13, the electric supply switch 16, and the camera microcomputer 19. A locking unit corresponds to the lens microcomputer 24a and the solenoid 41.

Figure 6:
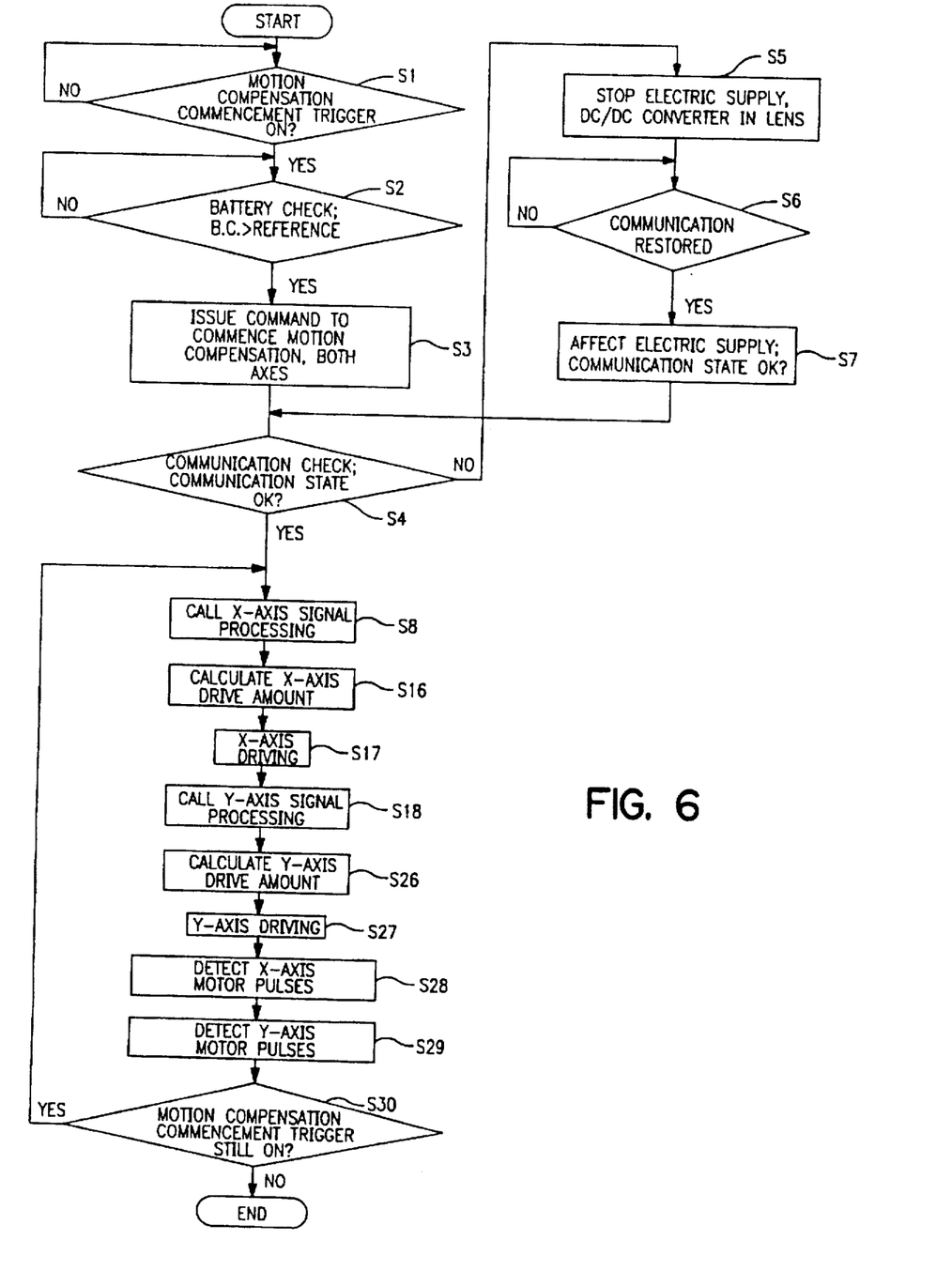
FIG. 6 is a flow chart which describes the operation of the camera shown in FIG. 5.
Figure 7:
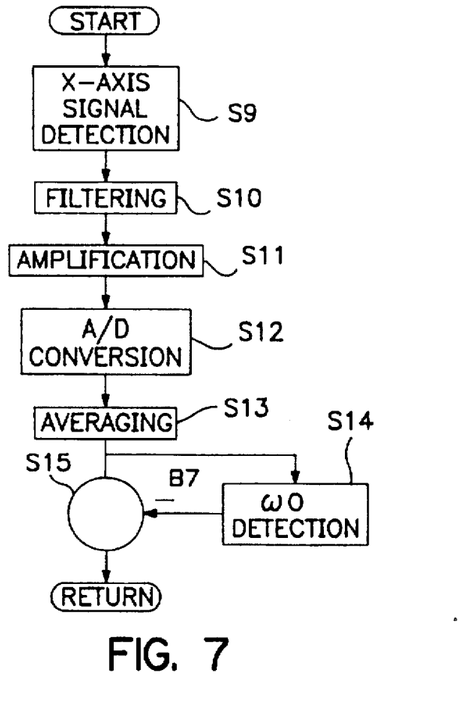
FIG. 7 is a flow chart describing the X-axis signal processing shown in FIG. 6.
Figure 8:
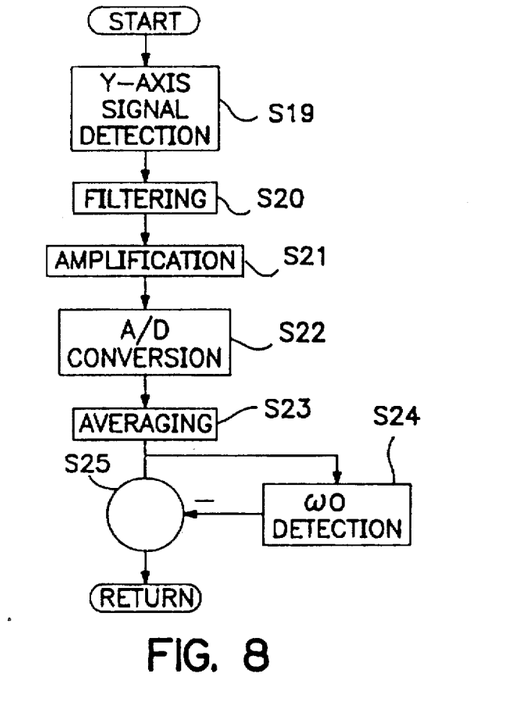
FIG. 8 is a flow chart describing the Y-axis signal processing shown in FIG. 6.

FIGS. 6 through 8 are flow charts which describe the operation of the camera according to an embodiment of the present invention.

First, when a release button (not shown in the drawing) is half-depressed, the camera microcomputer 19 causes the DC/DC converter 14 to start operation, permitting an electric supply to reach the lens microcomputer 24a in the photographic lens 12 via the contact point A.

The lens microcomputer 24a, at this starting point, is directed to "commence electric supply to contact point F" by the camera microcomputer 19. The lens microcomputer 24a receives the commencement signal from the camera microcomputer 19 via the contact point D, and the electric supply switch 16 is set to the ON state by the camera microcomputer 24a, resulting in the battery voltage of the battery 13 supplying electricity to the photographic lens 12 side.

The battery voltage supplies electricity directly to the DC/DC converter 21 and motor drivers 22, 23. The lens microcomputer 24a, by starting the DC/DC converter 21, allows an electric supply to reach the slave microcomputer 25 and the angular velocity sensor 26. In this manner, after the battery voltage has been supplied to the photographic lens 12, the following motion compensation is commenced (see step S1 of FIG. 6).

FIG. 6 shows the same operation as that shown in the operation shown in FIG. 2, pertaining to the first type of conventional camera, with the exception being the addition of steps S4 through S7.

At step S2, the camera microcomputer 19 performs a check of the battery voltage of the battery 13, entering a waiting state until the battery voltage becomes greater than a predetermined permissible value. In the case that the battery voltage is greater than the predetermined permissible value, at step S3, the camera microcomputer 19 communicates a motion compensation operating instruction to the lens microcomputer 24a via the contact point D.

At step S4, the lens microcomputer 24a determines whether or not the communication of the operating instruction is performed normally. For example, the lens microcomputer 24a determines whether or not a predetermined communication sequence has ended normally, determines whether or not a state of no data transmission continues for a predetermined time, and determines whether a message is received which includes previously set predetermined data that is erroneous. The lens microcomputer 24a knows the interval between an operating instruction and a next operating instruction, and is able to determine whether the operating instruction is unidentifiable.

In the case that an anomaly occurs in the communication transmission, the lens microcomputer 24a calculates the drive amount of the motors 27, 28 which is necessary to center the motion compensation optical system 40. The slave microcomputer 25, based on this drive amount, controls the motors 27, 28, causing the optical axis of the motion compensation optical system 40 to coincide with the optical axis of the photographic lens 12. After the end of such a centering control, the lens microcomputer 24a, via the solenoid 41, locks the oscillation of the motion compensation optical system 40. Here, the lens microcomputer 24a sets the operation of the DC/DC converter 21 to the OFF state, and stops the electric supply by the DC/DC converter 14, at step S6 of FIG. 6.

In this state, the electric supply to the angular velocity sensor 26, slave microcomputer 25 and the like is stopped, and the motion compensation is temporarily halted. In such a state in which the electric supply has stopped, the camera microcomputer 19 and the lens microcomputer 24a perform a repetition of the operating instructions. After it has been confirmed that this communication has ended correctly at step S6, the locking of the motion compensation optical system is released, and the DC/DC converter 21 starts operation again at step S7. In this manner, the electric supply is restored to the angular velocity sensor 26, slave microcomputer 25 and the like, and motion compensation is carried out.

Once the correct communication state has been confirmed by the lens microcomputer 4a and the electric supply is restored to the photographic lens 12 side, the motion compensation operation shown in steps S8 through S30 in FIGS. 6 through 8 are performed, these steps being identical to the similarly labelled steps in corresponding FIGS. 2 through 4.

As has been mentioned above, in the motion compensation optical system of the camera according to the above first embodiment of the present invention, because it is decided whether or not communication has been correctly performed on the lens microcomputer 24a side, a situation in which an operation instruction is erroneously communicated, due to a bad contact or noise, etc., of the contact point D, can be accurately detected.

Because the electric supply to the angular velocity sensor 26, motor drivers 22, 23 and the like stops in response to such a communication anomaly, motion compensation due to erroneous operating instructions can be prevented. Accordingly, no large loads are applied to the lenses and the like due to erroneous operating instructions, and damage to the various devices of the camera may be prevented.

Moreover, because a situation in which the optical axis of the photographic lens 12 is oscillated arbitrarily due to erroneous motion compensation information can be prevented, and the situation that erroneous image blur occurs can be accurately prevented.

Furthermore, because an erroneous operation of motion compensation is prevented, there is no useless exhaustion of the battery 13, and the period for which the battery 13 can be utilized may be extended.

When the communication operation is reinstated to a correct (normal) state, because the electric supply is restored to the angular velocity sensor 26, motor drivers 22, 23, and the like, the operation of the motion compensation which was temporarily halted, can be correctly restored, according to the correct state of communication operation.

Accordingly, the motion compensation device of the camera can be accurately protected with respect to sudden communication anomalies.

Furthermore, because motion compensation is restored, it is unnecessary for the operator to reset the camera, and again change over to the motion compensation mode. Ease of operation of the camera can thereby be increased.

In the above-mentioned first embodiment of the present invention, the angular velocity sensor 26 is arranged on the photographic lens 12 side but, by disposing the angular velocity sensor 26 on the camera body 11 side, data of the amount of vibration may be communicated from the camera body 11 side to the photographic lens 12 side. In such a configuration, because the electric supply to the photographic lens 12 stops, corresponding to a communication anomaly of the vibration amount, erroneous operation of the motion compensation based on an erroneous amount of vibration transmitted to the lens microcomputer 24a can be accurately prevented.

Figure 9:
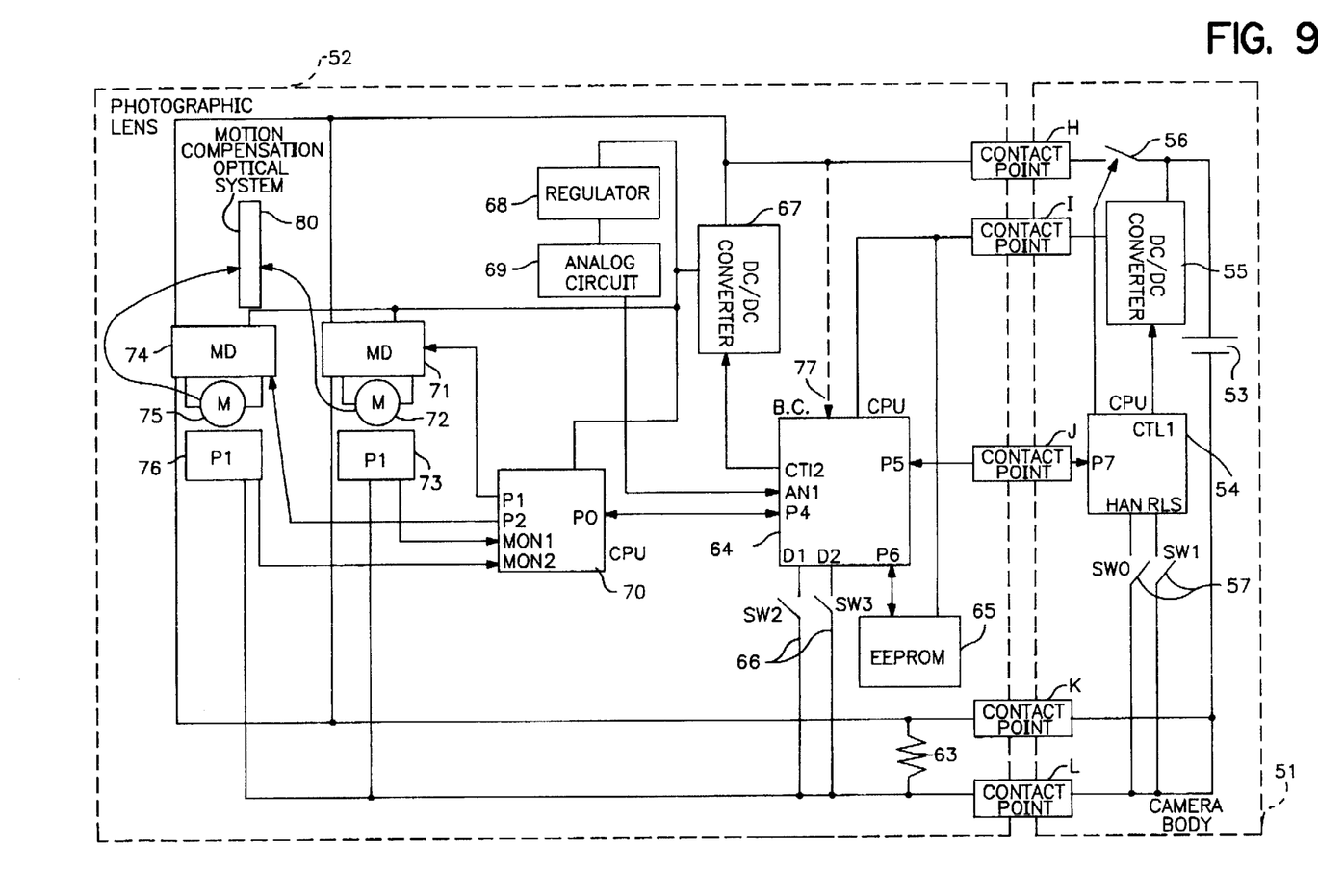
FIG. 9 is a block diagram showing a camera according to an embodiment of the present invention.

FIG. 9 is a block diagram showing a camera according to another embodiment of the present invention. A camera body 51 is attached to but detachable from a photographic lens 52. The camera body 51 contains a battery 53, a CPU 54, a DC/DC converter 55, a control switch which supplies electricity to the photographic lens 52, and a release switch 57 (SW0, SW1 connected to terminals HAN, RLS of CPU 54, respectively) having a 2-step stroke. Electrical contact points H and I supply electricity inside the photographic lens 52, an electrical contact point J is used for communication between the photographic lens 52 and the camera body 51, electrical contact point K is a ground potential electrical contact point, and an electrical contact point L is a ground potential which has been connected to metal hardware of the camera body. A resistor 63 prevents an electrical potential difference from arising with the contact point(s) when a large current flows in the line of a particular electrical contact point. The photographic lens 52 contains a CPU 64 which manages the battery control and the like within the photographic lens 52, a non-volatile memory (EEPROM) 65 which stores data related to the lens, etc., a 2-bit set switch 66 (SW2, SW3 connected to terminals D1, D2 of CPU 64, respectively) which sets the mode of motion compensation, a DC/DC converter 67, and a constant voltage regulator 68 for analog circuit use. The photographic lens 52 also contains an analog processing circuit 69 which processes the sensor input used in motion compensation control, a CPU 70 which manages the motion compensation control, motor drivers 71, 74 for driving, motors 72, 75, respectively, to move a motion compensation optical system 80, detection circuits 73, 76 which detect the rotation of the motors, and a battery check circuit 77.

The motion compensation device operates in the following two cases. One case occurs when the release switch 57 is half-depressed (SW0 closed) while switch SW2 (of set switch 66) is H and switch SW3 (of set switch 66) is L (which sets the motion compensation mode). The second situation occurs when the release switch 57 is fully depressed (SW1 closed) while switch SW2 is L and switch SW3 is H. During the performance of motion compensation suppression, the motion compensation optical system 80 is set in an optical axis position. This is because when the motion compensation optical system 80 is in an offset position, there are cases in which there is no clearance for the motion compensation optical system 80 in the direction which negates image blur. During operation of the camera in a motion compensation mode, a centering command is transmitted from the camera body 51 to the photographic lens 52 in a fixed amount of time.

Power is supplied to the CPU 64 via the electrical contact point I when the photographic lens 52 is mounted on the camera body 1. The CPU 64, supplied with power, receives a centering command from the CPU 54 in the camera body 51 via the electrical contact point J. The CPU 64 controls the motor drivers 71, 74 via the CPU 70, to drive the motors 72, 75, thereby setting the motion compensation optical system 80 in an optical axis position.

Moreover, when the battery 53 is inserted into the camera, at first the CPU 54 in the camera body 51 starts operation, and by starting the DC/DC converter 55, starts operation of the CPU 64. At this time, the CPU 54 gives rise to a centering command to CPU 64. The CPU 64, having received the centering command, controls the motor drivers 71, 74 via the CPU 70, to drive the motors 72, 75, thereby setting the motion compensation optical system 80 in an optical axis position.

Figure 10A:
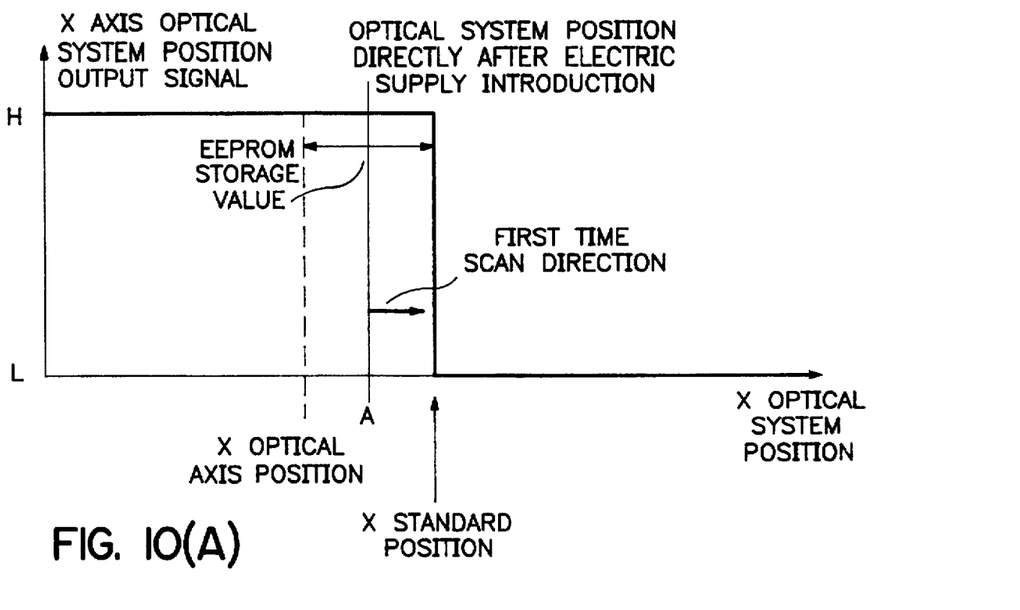
FIGS. 10(A) and 10(B) are diagrams showing the centering operation of the motion compensation optical system for a camera according to the embodiment of the present invention shown in FIG. 9.
Figure 10B:
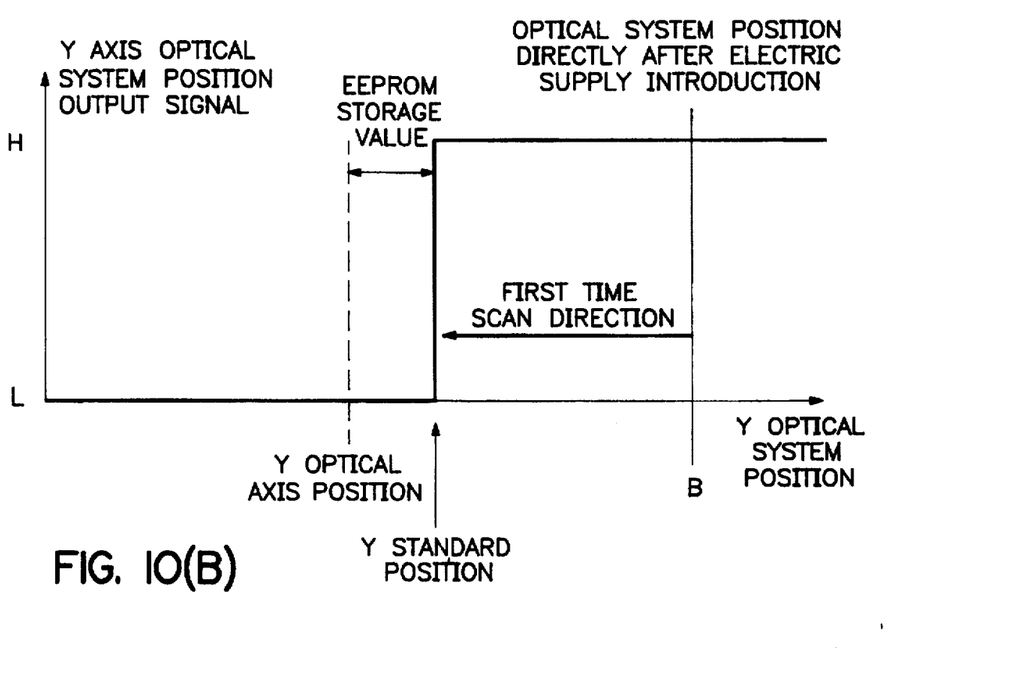

FIGS. 10(A) and 10(B) are diagrams which describe the method of centering the motion compensation optical system 80 for the camera according to the embodiment of the present invention shown in FIG. 9. The position of the motion compensation optical system 80 directly after the lens has been mounted and supplied with power is shown as point A on the X axis in FIG. 10(A) and point B on the Y axis in FIG. 10(B). When a centering command is issued from the camera body 51 to the photographic lens 62, the CPU 70, to know where the position of each axis of the optical system is, performs a scan in the standard position direction. For example, when the X axis optical system position signal is an H level, at point A of FIG. 10(A), a scan is performed in the positive direction of the X axis optical system position.

Moreover, a scan is performed in a negative direction of the Y-axis optical system position. When the scan being performed has reached the standard position, for example, the counter which is monitoring the position is reset, and the position of the optical system is known to be at an amount of change from the standard position. Then, furthermore, data of the distance from the standard position to the optical axis position is read out from the EEPROM 65, and the optical system in the X-axis and Y-axis directions is moved by these amounts, respectively. As a result, the motion compensation optical system 80 is set in the optical axis position along each axis.

The motion compensation optical system 80 is scanned to the standard position when this centering operation is performed. If the X- and Y-axis optical system position output signals of FIGS. 10(A) and 10(B) do not change even when a scanning operation is performed, or else in the case that the scanning direction and the signal polarity do not agree, the CPU 64 determines that there is a defect. That is, in the case of the X-axis of FIG. 10(A), the CPU 64 detects a defect when the X-axis optical system position output signal is at an H level, and there is no change to the L level when scanned in the positive direction. Moreover, in the case of the Y-axis, the CPU 64 detects a defect in the case that when scanning in the positive direction, there should be a change from the H to the L level, but on the contrary, in the case of a change from L to H, a defect is determined.

In the case that a defect to centering has been determined as above, by thereafter inhibiting the control of the motion compensation optical system 80, damage to the control system beyond this point is stopped. Moreover, by displaying this defect information, such display may be used as a warning, etc.

Figure 11:
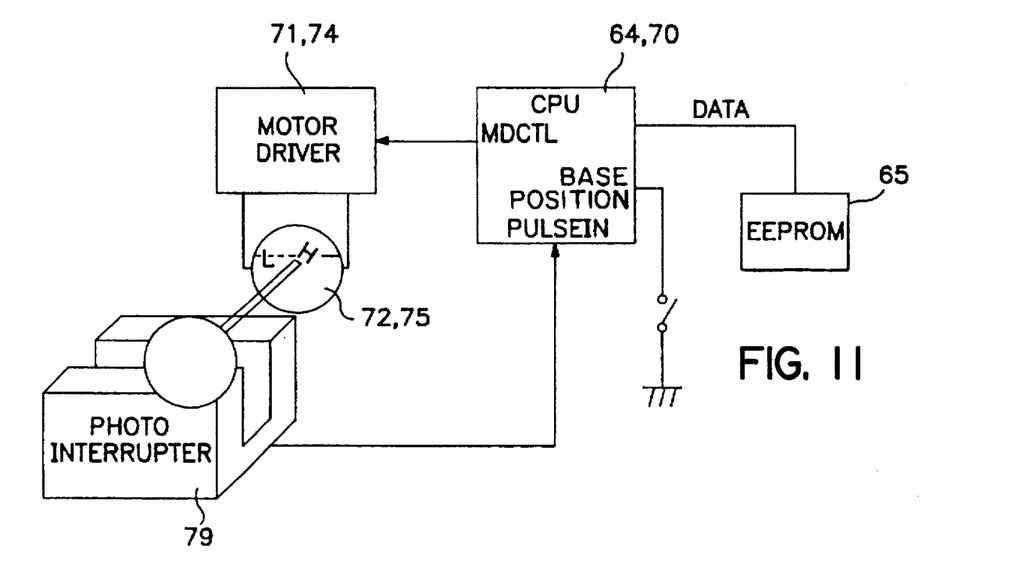
FIG. 11 is a block diagram showing circuits for reading out the motion compensation amount for a camera according to the embodiment of the present invention shown in FIG. 9.

FIG. 11 shows that CPUs 64 and 70, such as when power is supplied, read out the compensation amount (DATA) from the standard position as far as the optical axis position, previously stored in EEPROM 15. Due to a centering command from the body CPU 54, the CPUs 64 and 70 in the photographic lens 52 observe now whether the standard position switch is at the H level or the L level and, as a result, the motors 72 and 75, proceeding to the standard position, are driven via the motor drivers 71 and 74. The amount of rotation is monitored by a photo-interrupter 79. The CPUs 64 and 70 recognize that the standard position switch 78 (FIG. 12), has changed by the edge interruption, and the counter which monitors the motor rotation is reset at this time. The motors 72 and 75 are driven further, to the extent of the compensation amount (DATA) already read out from the EEPROM 65. This completes the centering operation.

Figure 12:
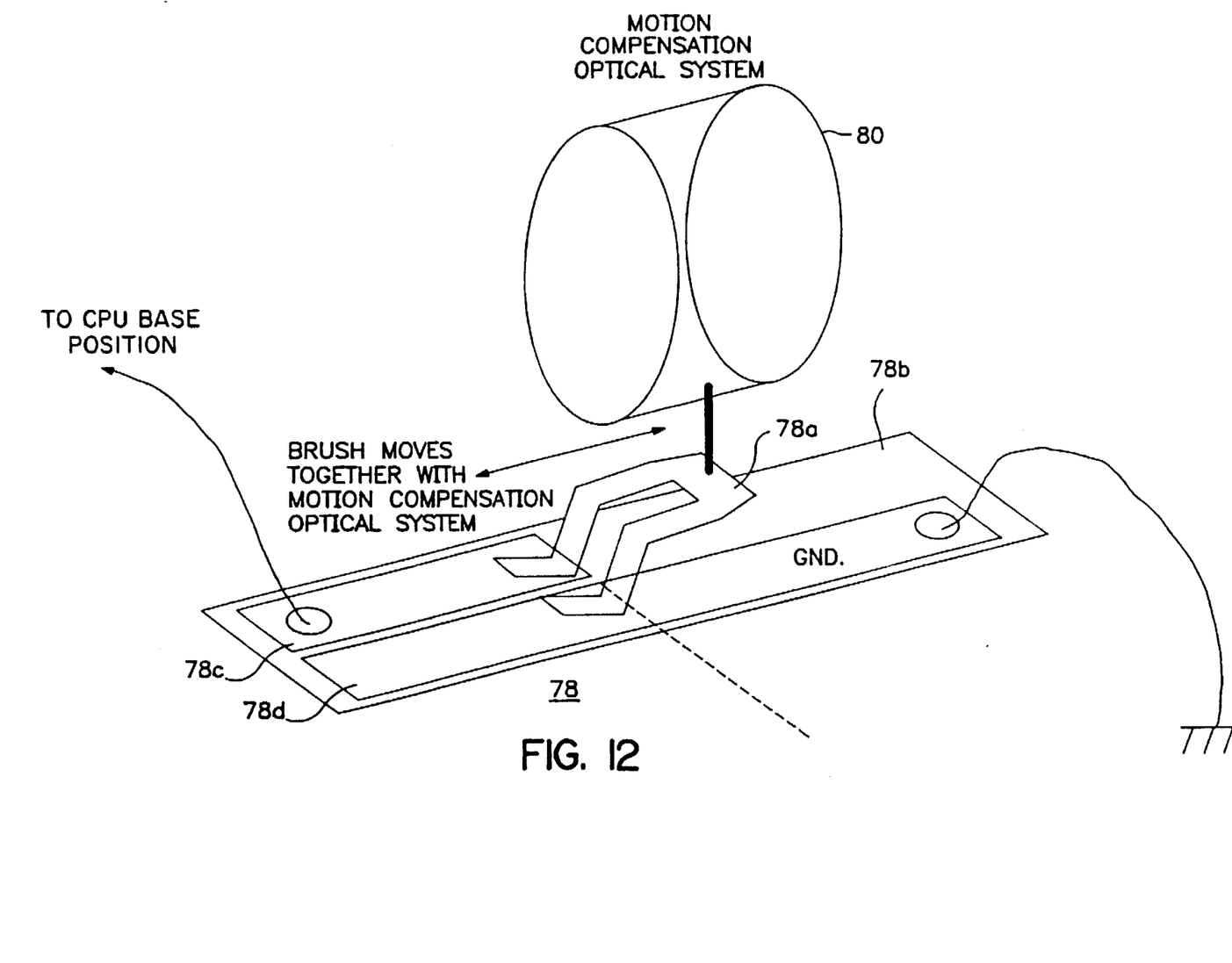
FIG. 12 is an oblique diagram showing a switch for a camera according to the embodiment of the present invention shown in FIG. 9.

FIG. 12 shows the constitution of the standard switch 78, and the motion compensation optical system 80 moves in a straight line, from the beginning of the compensation period. An electrically conducting brush 78a has been fixed to the motion compensation optical system 80 and these elements move in conjunction with each other, such that the conducting brush 78a moves on the patterns 78c and 78d on the circuit board 78b. The position of the motion compensation optical system 80 determines whether or not the standard base positions of the CPUs 64 and 70 and the GND pattern are in a state which has been made electrically conductive.

Figure 13:
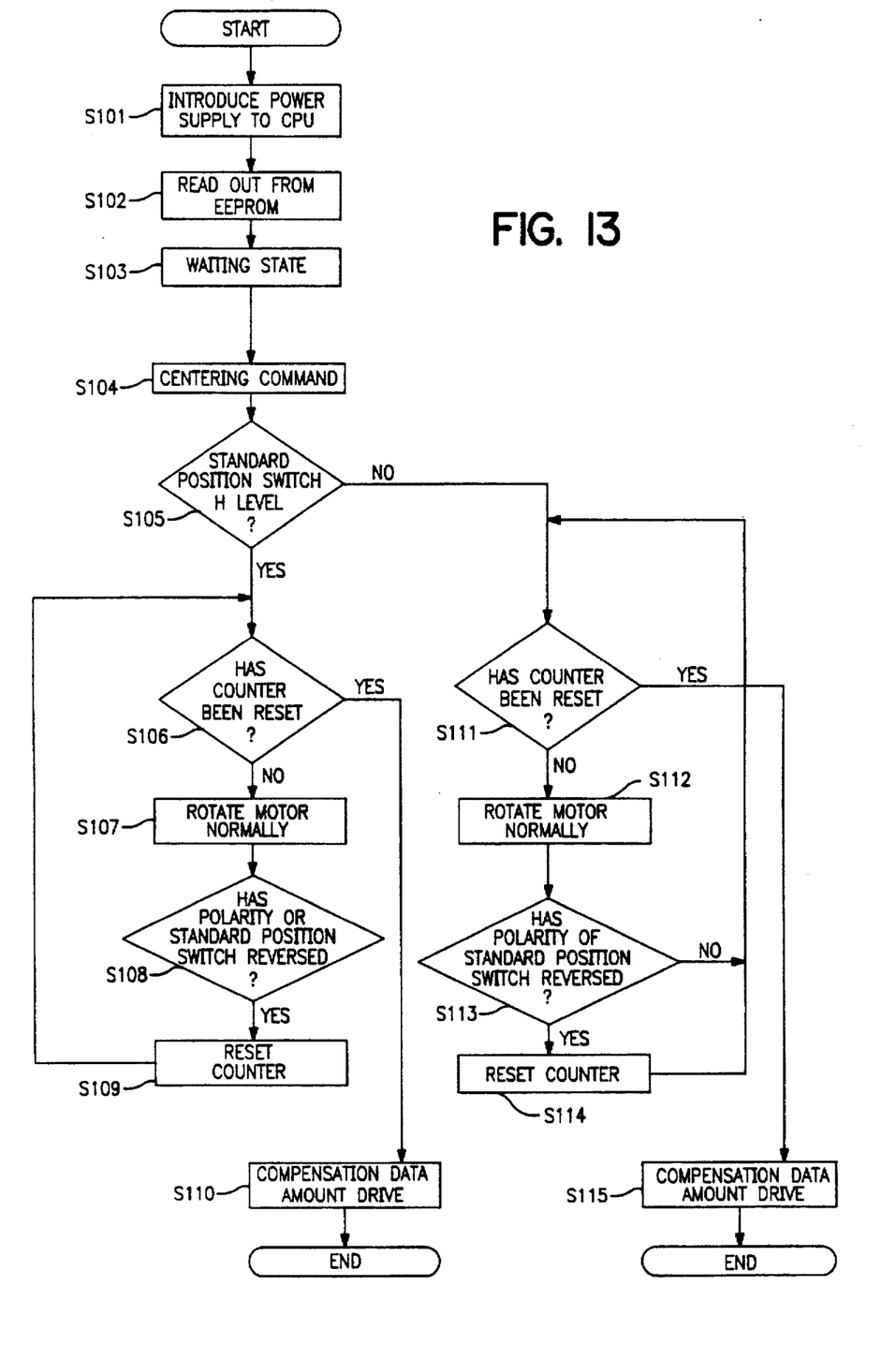
FIGS. 13 is a flow chart showing the motion compensation operation for a camera according to the embodiment of the present invention shown in FIG. 9.

FIG. 13 shows the motion compensation operation for the camera according to the second embodiment of the present invention. At step S101, a power supply switch (not shown) is turned ON and when release switch is half-depressed (SW0), power from the battery 53 is supplied to the CPU 64 via contact point I. At step S102, the pulse amount from the standard position switch is read out from the EEPROM 65. At step S103, the CPU 64 enters a centering ring command waiting state and at step S5, emits a centering command to the CPU 70. The CPU 70 determines the present polarity of the standard position switch 78. If the output of the standard position switch 78 is the H level, the process proceeds to S106, and if not at the H level, the process proceeds to step S111.

At step S106, a determination is made whether a counter which monitors the motor rotation pulses has been reset, and if so, the process proceeds to step S110, wherein the motors 72, 75 are driven by the amount of compensation pulses read out from the EEPROM. If the counter has not been reset at step S106, the motors 72, 75 are rotated normally. At step S108, a determination by the CPU 70 is made as to whether the polarity of the standard position switch 78 has been reversed. If so, at step S109, the counter is reset. If not, the process returns to step S106.

If the CPU 70 determines that the standard position switch 78 is not at the H level, a determination is made as to whether the counter has been reset at step S111. If the counter has been reset, then the motors 72, 75 are driven by the amount of compensation pulses read out from the EEPROM at step S115. However, if the counter has not been reset, the motors 72, 75 are rotated normally. At step S113, a determination is made as to whether the polarity of the standard position switch 78 has been reversed. If so, the counter is reset at step S114 and the process returns back to step S111. If the polarity of the standard position switch has not reversed at step S113, the process simply returns to step S111.

As described above, in the optical system of the motion compensation device whose optical axis is movable, by performing the operation of certainly setting the motion compensation optical system at the optical axis position at the lens installation time, it is determined whether or not the operation of causing the motor to stop at the standard position could be executed. As a result, at the installation instant before photography, it can be determined whether the motion compensation device is faulty.

Moreover, the optical system of the motion compensation device has an optical axis which is movable, and by invariably performing the operation of setting the position of the optical axis at the time of loading a battery, it is determined whether the movement which causes the motor to stop at the target position could be executed. As a result, at the time of loading a battery, it can be determined before photography whether or not the motion compensation device is faulty.

Furthermore, the centering operation is one of the operations which is necessarily performed during control, and by also using this in the fault determination of the control system, the effect is that waste is eliminated by combining the operations.

The centering operation directly after the lens has been supplied with electric power, namely the centering operation due to battery changing, lens interchange, or the main switch being set ON, has been described, but there is no limitation to such cases, and the present invention in which a CPU can command the centering operation at an optional time.

In the camera according to the first embodiment of the present invention, because an anomaly of the communication unit is detected, due to bad contact or noise of contact points, a situation in which there are alterations in operating instructions or vibration amount data can be accurately detected.

Due to an anomaly of the communication unit, because the electric supply for the motion compensation unit and the motion detection unit stops, motion compensation based upon erroneous data can be prevented. Accordingly, situations in which the optical axis of the photographic lens is arbitrarily oscillated due to erroneous motion compensation are prevented, and situations in which pictures with a large amount of blurring are erroneously imaged can be prevented. Furthermore, because the erroneous operation of motion compensation is prevented, there is no useless exhaustion of the battery, and the period for which the battery can be used can be extended.

Because the electric supply is restored to the motion compensation unit or the motion detection unit when the operation of the communication unit is reinstated to a normal state, the operation of motion compensation can be accurately temporarily halted, and accurately restored, according to the state of the communication unit. Accordingly, the motion compensation mechanism of a camera can be accurately protected with respect to sudden communication anomalies.

Moreover, because motion compensation is restored, it is not necessary for the operator to reset the camera and to again change over to the motion compensation mode, and the ease of operation can be increased.

Due to the locking of the optical axis of the photographic lens accompanying communication anomalies, the optical axis of the photographic lens does not freely oscillate. As a result, in the period that the electric supply is stopped, the inadvertent oscillation of the optical axis of the photographic lens and the situation in which pictures with large blurring are erroneously imaged can be accurately prevented. In the period in which the electric supply stops, the optical axis of the photographic lens does not undergo large excitations, and situations in which movable parts and the like are damaged may be accurately prevented.

When a communication anomaly occurs, because the optical axis of the photographic lens is locked after having been centered, the optical axis of the photographic lens may be fixed in its normal position.

Accordingly, during the period in which the electric supply stops, lens aberrations and the like are well suppressed, and photography can be performed with the performance of the photographic lens in a sufficiently situated state.

The camera, according to the second embodiment of the present invention, is equipped with the motion detection device which detects image blur, and the motion detection compensation mechanism which compensates the image blur, and a control device which controls the motion compensation mechanism based on the signals of the motion detection device. Because the control device, in a predetermined mode, is made so as to set the motion compensation mechanism in a predetermined position, by detecting whether or not the motion compensation mechanism can be set in the predetermined position, the control device can diagnose a fault of the motion compensation control system. Accordingly, it is possible to diagnose a fault of the motion compensation control system before photography is performed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera having a photographic lens for producing an image of a photographic subject and a camera body, attached to the photographic lens, for receiving the image from the photographic lens, the camera comprising:

a motion detection unit to detect motion of one of the photographic lens and the camera body and, in response, generate operating instructions;

a motion compensation unit to move the optical axis of the photographic lens in a direction to negate the motion detected by said motion detection unit in response to the operating instructions;

a communication unit to transmit the operating instructions from said motion detection unit to said motion compensation unit;

a monitoring unit to monitor the operating instructions and determine whether the operating instructions are unidentifiable, and thereby determine whether an anomaly exists; and an electric supply unit to stop operation of said motion compensation unit in response to receiving an indication that the anomaly exists in the operating instructions.

2. The camera as claimed in claim 1, wherein said monitoring unit additionally determines that an anomaly exists in the operating instructions if a predetermined communication sequence exists in the operating instructions.

3. The camera as claimed in claim 1, wherein said monitoring unit additionally determines that an anomaly exists in the operating instructions if a predetermined period of time passes between transmission of two consecutive operating instructions by said communication unit.

4. The camera as claimed in claim 1, wherein when said monitoring unit determines that the anomaly no longer exists in the operating instructions, said electric supply unit resumes operation of said motion compensation unit.

5. The camera as claimed in claim 1, further comprising a locking unit which locks the photographic lens in position in response to said monitoring unit determining that the anomaly exists.

6. The camera as claimed in claim 4, further comprising a locking unit which locks the photographic lens in position in response to said monitoring unit determining that the anomaly exists.

7. The camera as claimed in claim 1, further comprising a locking unit which first centers the photographic lens and then locks the photographic lens in position in response to said monitoring unit determining that the anomaly exists.

8. The camera as claimed in claim 7, wherein said locking unit is a solenoid.

9. The camera as claimed in claim 4, further comprising a locking unit which first centers the photographic lens and then locks the photographic lens in position in response to said monitoring unit determining that the anomaly exists.

10. The camera as claimed in claim 1, wherein said electric supply unit prevents an electric supply from reaching said motion detection unit and said motion compensation unit in response to receiving an indication that the anomaly exists in the operating instructions.

11. A camera for generating an image of a photographic subject and having a camera body, the camera comprising:

a motion detection unit to detect motion of the camera body;

a motion compensation optical system to compensate for blurring of the image caused by the detected motion;

a motion compensation unit to drive said motion compensation optical system to compensate for the image blur; and a control unit to control said motion compensation unit based upon the detected motion of said motion detection unit, wherein said control unit controls said motion compensation unit to drive said motion compensation optical system to a predetermined position in a motion compensation mode in response to an occurrence of an event, the event being one of a photographic lens being mounted on the camera body and a power supply being connected to the camera.

12. The camera as claimed in claim 11, wherein the power supply is a battery loaded into the camera body.

13. The camera as claimed in claim 11, wherein said motion compensation unit drives said motion compensation optical system in a scanning operation to the predetermined position for each of two perpendicular axes prior to performing the compensation for the image blur.

14. The camera as claimed in claim 13, further comprising a detection unit for determining whether a defect exists in the scanning operation and inhibiting motion of said motion compensation optical system if the defect exists.

15. The camera as claimed in claim 11, wherein said predetermined position is a center position of said motion compensation optical system.

16. The camera as claimed in claim 15, further comprising:

a measurement unit to measure a distance between the predetermined position and an optical axis position for each of two axes of the motion compensation optical system; and a memory to store said distances, wherein said control unit retrieves said distances to move said motion compensation optical system from said center position to said optical axis positions in each of said two axes.

17. A camera, comprising:

a photographic lens;

a motion detection unit to detect camera motion and generate operating instructions in response to the motion;

a motion compensation unit to move the optical axis of the photographic lens in response to the operating instructions;

a monitoring unit to determine whether an anomaly exists by monitoring the operating instructions;

an electric supply unit to stop operation of said motion compensation unit in response to determination by said monitoring unit that an anomaly exists in the operating instructions; and a locking unit to center and lock the photographic lens in response to determination by said monitoring unit that an anomaly exists in the operating instructions.

18. The camera as claimed in claim 17, wherein said locking unit is a solenoid.

19. A camera, comprising:

a photographic lens;

a motion detection unit to detect camera motion and generate operating instructions in response to the motion;

a motion compensation unit to move the optical axis of the photographic lens in response to the operating instructions;

a monitoring unit to monitor the operating instructions and determine if the operating instructions are unidentifiable; and an electric supply unit to stop operation of said motion compensation unit in response to determination by said monitoring unit that the operating instructions are unidentifiable.

20. A camera, comprising:

a camera body;

a photographic lens including an optical system in electrical communication with the camera body;

a centering unit disposed within said photographic lens to center the photographic lens in response to a command from the camera body;

a scan unit to scan position directions of the optical system after said centering by said centering unit;

a monitoring unit to compare the position directions scanned by said scan unit with predetermined values;

a motion compensation unit to move the optical axis of said photographic lens; and an electric supply unit to stop operation of said motion compensation unit in response to determination by said monitoring unit that the position directions scanned by said scan unit do not accord with the predetermined values.

* * * * *